(12) United States Patent
Schwitter et al.

(10) Patent No.: US 10,919,041 B2
(45) Date of Patent: Feb. 16, 2021

(54) PREPARING AND ANALYZING SOLID FORM PROPERTIES OF A SUBSTANCE

(71) Applicant: HOFFMANN-LA ROCHE INC., Little Falls, NJ (US)

(72) Inventors: Urs Schwitter, Reinach (CH); Frédéric Ran, Kembs (FR); André Alker, Weil am Rhein (DE); Tom Kissling, Riehen (CH); Thomas Zumstein, Weil am Rhein (DE)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 0 days.

(21) Appl. No.: 16/345,217

(22) PCT Filed: Oct. 27, 2017

(86) PCT No.: PCT/EP2017/077665
§ 371 (c)(1),
(2) Date: Apr. 25, 2019

(87) PCT Pub. No.: WO2018/078129
PCT Pub. Date: May 3, 2018

(65) Prior Publication Data
US 2019/0291104 A1    Sep. 26, 2019

(30) Foreign Application Priority Data
Oct. 28, 2016   (EP) .................................... 16196151

(51) Int. Cl.
*G01N 23/207*       (2018.01)
*B01L 3/00*         (2006.01)
(Continued)

(52) U.S. Cl.
CPC ............. *B01L 3/50853* (2013.01); *B01L 3/06* (2013.01); *B01L 3/5085* (2013.01);
(Continued)

(58) Field of Classification Search
CPC .......... B01J 19/0046; B01J 2219/00317; B01J 2219/00333; B01J 2219/00423;
(Continued)

(56) References Cited

U.S. PATENT DOCUMENTS

2006/0051251 A1   3/2006  Desrosiers et al.
2009/0010388 A1   1/2009  Stahly et al.
(Continued)

OTHER PUBLICATIONS

International Search Report and Written Opinion dated Nov. 16, 2017 in International Patent Application No. PCT/EP2017/077665.

*Primary Examiner* — Irakli Kiknadze
(74) *Attorney, Agent, or Firm* — Medler Ferro Woodhouse & Mills PLLC

(57) ABSTRACT

In a method of analyzing solid form properties of a substance, which including the step of solidifying the substance, the solidified substance is obtained in one of a plurality of wells of a multi-well plate. In the multi-well plate the at least one of the plurality of wells has a bottom made of a thermoplastic polyimide. The method further includes analyzing the solidified substance in the well of the multi-well plate by X-ray diffraction. Thereby, the analysis includes providing X-ray through the solidified substance and a bottom of the well and evaluating the X-ray which passed the solidified substance and the bottom of the well. Such method and multi-well plate provide a durable and cost efficient system allowing a high quality analysis of solid form properties of the substance and an efficient and safe processing of the substance.

16 Claims, 11 Drawing Sheets

(51) Int. Cl.
*B01L 3/06* (2006.01)
*G01N 23/20025* (2018.01)
*G01N 23/20* (2018.01)

(52) U.S. Cl.
CPC . *G01N 23/20025* (2013.01); *G01N 23/20075* (2013.01); *B01L 2300/042* (2013.01); *B01L 2300/0829* (2013.01); *B01L 2300/0851* (2013.01); *B01L 2300/0858* (2013.01)

(58) Field of Classification Search
CPC .... B01J 2219/00585; B01J 2219/00599; B01J 2219/00756; B01J 2523/00; B01J 2523/68; B01J 2523/842; B01J 2523/31; B01J 2523/47; B01J 2523/55; B01J 2523/67; B01J 2523/845; B01J 2523/69; B01J 2523/22; B01J 2523/23; B01J 2523/41; B01J 2523/847; B01L 2300/042; B01L 2300/0829; B01L 3/06; B01L 3/50255; B01L 3/50853; B01L 2300/0851; B01L 2300/0858; B01L 3/5085; G01N 23/20025; G01N 23/20075; G01N 2015/149; G01N 2035/00782; G01N 2333/9121; G01N 2500/00; G01N 33/542; G01N 33/54353; G01N 33/54393; G01N 35/00732; G01N 35/00871; G01N 2223/056; B82Y 30/00; B82Y 40/00; B82Y 10/00; B82Y 20/00; H01M 10/0525; H01M 4/366; H01M 10/052; H01M 2004/027; H01M 4/1393; H01M 4/587; H01M 2220/20; H01M 2300/0082; H01M 2300/0091; H01M 4/0416; A61K 47/32; A61K 9/0024
USPC ..................................................... 378/70, 79
See application file for complete search history.

(56) References Cited

U.S. PATENT DOCUMENTS

2009/0205412 A1 8/2009 Stam et al.
2019/0293576 A1* 9/2019 Schwitter .............. B01L 3/5085

* cited by examiner

PREPARING AND ANALYZING SOLID FORM PROPERTIES OF A SUBSTANCE

TECHNICAL FIELD

The present invention relates to a multi-well plate according to the preamble of independent claim 1 and more particularly to a method of preparing and analyzing solid form properties of a substance. Such multi-well plates having a plurality of wells can be used for processing a substance in solid form screening or polymorphism screening.

BACKGROUND ART

In chemical, biochemical and pharmaceutical research and development, various product manufacturing processes involve, at a certain stage, the creation of a substance in a solid form such as a crystallized form. Thereby, it often is highly relevant that the structure and condition of the solid form meets specific requirements. For that purpose, many development and particularly research processes include solid form screening in which solid form properties of substances are analyzed.

For analyzing the solid form properties, e.g., in a solid form or polymorphism screening process, X-ray diffractometry (XRD) and X-ray powder diffractometry (XRPD) are known and often preferred methods to apply. In this context, the term "solid form properties" can relate to any feature characteristic for the solidification or preparation of the substance. For example, such properties may include chemical structure, solid form, crystallinity or the like. Thereby, the substance or a powder thereof having a solid structure is irradiated with X-ray. The crystals in the powder diffract the X-ray similar to a diffraction grid and maxima of the diffracted X-ray is scanned and measured with a detector. The location and intensity of the measured peaks are representative for the solid structure of the substance.

Furthermore, in development and research substances typically are provided and processed in standardized multi-well microtiter plates. When using such a microtiter plate for processing a substance, it is usually arranged inside a well of the microtiter plate. For applying XRD or XRPD in X-ray reflection geometry to the substance in the well X-ray is typically provided top down into the well, reflected in the well or at a bottom thereof and measured by a detector after reflection, typically above the well. Thereby, it often is quite cumbersome to evaluate the reflected X-ray since it may be affected by preferred orientation effects, sample displacement/transparency error and other errors that can negatively influence peak positions/intensity and peak shape.

Furthermore, for being capable to process highly active substances and corrosive substances inside the wells the microtiter plate has to be specifically embodied. For example, it is known to coat the microtiter plates or at least the inside of the wells thereof with polytetrafluoroethylene (PTFE or Teflon). Like this, unintended reactions of the substances within the microtiter plate itself can be prevented or reduced. However, PTFE-coatings are comparably soft such that they can comparably easily be scratched and damaged. Furthermore, manufacturing such microtiter plates is comparably cost intensive and damaged microtiter plates usually have to be disposed.

Still further, substances are typically also processed outside the microtiter plate since not all steps of usual processes can be performed when the substance is inside the well of the microtiter plate. For that purpose, the substance has to be transferred to another containment or place. Such transfer can be comparably cumbersome and dangerous. For example, at the end of many processes substances are often stored in specific storage microtiter plates wherein they have to be transferred and rearranged from one microtiter plate into another microtiter plate.

Therefore, there is a need for a durable and cost efficient system allowing a high quality analysis of solid form properties of a substance and an efficient and safe processing of the substance.

DISCLOSURE OF THE INVENTION

According to the invention this need is settled by a multi-well plate as it is defined by the features of independent claim 1, and by method of analyzing solid form properties of a substance as it is defined by the features of independent claim 8. Preferred embodiments are subject of the dependent claims.

In particular, the invention deals with a multi-well plate having a plurality of wells in which at least one of the plurality of wells has a bottom made of a thermoplastic polyimide. Preferably, all of the wells of the multi-well plate are equipped with a bottom made of the thermoplastic polyimide. Such material is at least partially amorphous and can particularly be completely amorphous.

The multi-well plate can have any suitable number of wells such as, e.g., 24 or 48 wells. It can particularly be a standard microplate having 96 wells, 384 wells or 1536 wells. Such standard microplates can be microtiter plates according to the standards developed by the Society for Biomolecular Screening (SBS) and approved by the American National Standards Institute (ANSI) are commonly used. These standards define microtiter plates of 127.76 mm length, 85.48 mm width and 14.35 mm height comprising 96, 384 or 1536 wells [see Society for Biomolecular Screening. ANSI/SBS 1-2004: Microplates—Footprint Dimensions, ANSI/SBS 2-2004: Microplates—Height Dimensions, ANSI/SBS 3-2004: Microplates—Bottom Outside Flange Dimensions and ANSI/SBS 4-2004: Microplates—Well Positions. http://www.sbsonline.org: Society for Biomolecular Screening, 2004.].

The substance can be a chemical, biological, pharmaceutical or bio-chemical substance. For example, it can be a drug, drug candidate or a component of a drug. In particular, the substance can be a chemically, biologically or biochemically active or highly active substance. Thereby, the term "biologically active substance" can refer to a substance or sample that has a beneficial or adverse effect on the metabolic activity of living cells.

Such substances often are toxic or even highly toxic at a certain dosage or, at least, it can be undesired to expose persons to the substance even to very small amounts thereof. Thus, it often is necessary to protect an environment around the substance, e.g., by containing it in a tight compartment.

By providing the bottom of the at least one of the plurality of wells of the multi-well plate in a thermoplastic polyimide, X-ray can pass the at least one of the plurality of wells through its bottom, typically top down. This allows for preferably linearly or quasi linearly providing X-ray through the substance arranged inside the at least one well and through the bottom.

As used in many embodiments, e.g., of solid form screening processes X-ray diffractometry (XRD) or X-ray powder diffractometry (XPRD) are known methods for analyzing solid form properties of substances. In such embodiments, the at least partially amorphous bottom of the at least one well allows for applying XRD or XPRD. For example, an X-ray beam can be sent more or less axially through the at least one well and be detected adjacent the bottom outside microtiter plate. Thereby, the X-ray passes the substance as well as the bottom before arriving a detector. The detected X-ray can then be evaluated and conclusions about the properties of the substance can be drawn. Since no reflection is necessary the X-ray detection and evaluation can be comparably precise, simple and accurate. The thermoplastic polyimide can be quasi X-ray amorphous or at least partially X-ray amorphous and show only diffuse scattering of the X-ray beam.

Further, providing the at least one of the plurality of wells with the bottom made of the thermoplastic polyimide allows for providing plural further essential benefits. For example, such material implies an insignificant or even no distortion of the X-ray such that the detected X-ray can be directly related to the substance. This can further improve the quality of the evaluation of the detected X-ray. Also, such material is more or less completely inert for many substances and does not influence the preparation or solidification process of the latter. This additionally helps for improving the quality of the X-ray evaluation. Still further, such material is quasi completely tight under conditions in which crystallization and other experiments such as salt and cocrystal screening often are performed. Like this, safety of the system can comparably easily be established. And still further, such material is also comparably robust and durable such that the substance can be processed and stored in the same multi-well plate.

Thus, the multi-well plate allows for providing a high quality analysis of solid form properties of a substance and an efficient and safe processing of it. Particularly, it also allows the process to be (semi-)automatic and to use laboratory or other equipment suitable for standard microplates.

Preferably, the bottom of the at least one of the plurality of wells has a thickness of about 150 micrometer ($\mu m$) or less, of about 100 $\mu m$ or less, of about 50 $\mu m$ or less or of about 25 $\mu m$. Such a thickness of the bottom allows for providing a sufficient robustness as well as an interference-free or quasi interference-free transparency for X-ray radiation when the bottom is made of the thermoplastic polyimide. Thus, such a bottom allows for performing preferably transmission XRD or preferably transmission XRPD and, thereby, accurately and efficiently analyzing the solid form properties of the substance.

The bottom of the at least one well can be embodied by foil-like layer mounted to below a through hole in the multi-well plate. For example, the foil layer can be clamped between two adjacent plates.

Preferably, the at least one of the plurality of wells comprises a through hole and a sample micro-vessel having a body with a sidewall portion, a bottom portion and a hollow interior limited by the sidewall portion and the bottom portion, wherein the sample micro-vessel is made of an at least partially amorphous thermoplastic polyimide (TPI), the sample micro-vessel is arranged in the through hole and the bottom portion of the body of the sample micro-vessel is the bottom of the well.

The term "sample" as used herein can relate to a limited quantity of the substance which is intended to be similar to and represent a larger amount of it. Even though this term often is understood to be a smaller quantity taken from a larger quantity also full specimens can be called samples, e.g., if taken for analysis, testing, or investigation like other samples.

The term "micro" in connection with the vessel relates to a dimension of the vessel suitable for carrying a sufficient amount or a sample of the substance for performing any desired testing, analysis, inspection, investigation, demonstration, or trial use. It can particularly relate to a dimension suitable for being arranged in a well of a microtiter plate such as a standard microplate as mentioned above.

The body of the sample micro-vessel can be cup shaped. Thereby, the sidewall portion of it can be cylindrical or essentially cylindrical. The basis or basis area of the cylinder can have any suitable form such as a square, triangle or polygon. Advantageously, the cylinder is a circular cylinder. By having a circular cylindrical sidewall portion, the sample micro-vessel can comparably easily be handled. In particular, when being used in a multi-well plate as described in more detail below, a circular cylindrical sidewall portion can be advantageous. The dimension of the sidewall portion can be as desired in an intended application of the sample micro-vessel. For example, in embodiments where the size of the sidewall portion is comparably small in relation to the base area of the cylinder the body can be quasi disk-shaped. Or in the opposite, in embodiments where the size of the sidewall portion is comparably big in relation to the base area of the cylinder the body can be quasi post-like shaped.

The body of the sample micro-vessel can be essentially circular cylindrical. Such a shape of the micro-vessel allows for a precise XRD or XRPD and a comparably simple handling particularly in a (semi-)automatic process. Particularly, it allows for being efficiently arranged and processed in the multi-well plate. Furthermore, the circular cylindrical body allows for an efficient and accurate X-ray scanning of the substance being positioned in the interior. Still further, such a body can comparably efficiently be manufactured.

Using the sample micro-vessel as part of the at least one well allows for efficiently providing the multi-well plate in accordance with the invention. In particular, the multi-well plate can be manufactured in any appropriate material, such as aluminium, which material has not to be adapted or chosen to the substance. Furthermore, handling of the substance inside the sample micro-vessel can be particularly efficient and convenient. It can be held in the micro-vessel during several steps in a process wherein, if desired, the micro-vessel together with the substance can be removed from the multi-well plate. Also the micro-vessel can be a single use entity whereas the other parts of the multi-well plate can be reused.

The inner surface of the sample micro-vessel can be provided with a structure adapted to preventing adherence of the solid substance and liquid phase. For example, such a structure can be generated using lithographic or nano-mechanical embossing methods.

Preferably, in the at least one of the plurality of wells the through hole has a structured inner surface and the body of the sample micro-vessel has a correspondingly structured outer surface such that the sample micro-vessel is held in the through hole. Such an arrangement allows for precisely and safely positioning the sample micro-vessel in the at least one well.

Preferably, in the at least one of the plurality of wells the bottom portion of the body of the sample micro-vessel and the sidewall portion of the body of the sample micro-vessel form an essentially right angle in the interior of the body. In this connection, the term "essentially right angle" can particularly cover angles which slightly deviate from 90°. For example, for allowing an efficient manufacturing it might be desired to have an angle which is not exactly 90°. The essentially right angle can be in a range of from 87° to 93°, from 88° to 92° or the like. Thereby, as described above, the body can essentially have the form of a right circular cylinder with a hollow interior, one closed end side, i.e., the bottom, and an open end side. The sidewall portion passing over into the bottom portion at a right angle allows for efficiently accessing the substance in the interior. For example, such an arrangement allows for pushing the substance to the bottom portion in order to making it efficiently accessible to the X-ray, e.g., by means of a rod accessing the interior or the like.

The sidewall portion of the body of the micro-vessel can have a thickness in a range of between about 400 μm and about 1500 μm, of between about 600 μm and about 1200 μm or of between about 700 μm and about 1000 μm. Such dimensions of the sidewall portion allow for providing a sufficient robustness. Also it can comparably easily be manufactured, for example in an injection molding process or an injection molding embossing process.

Preferably, in the at least one of the plurality of wells the sample micro-vessel comprises a cap adapted to be arranged on the body to close the interior of the body. The cap can particularly be arranged on the sidewall portion at a side opposite to the bottom portion. Such a cap allows for efficiently closing the micro-vessel and the at least one well. Particularly, the body of the micro-vessel can be tightly closed such that the system can provide an accurate safety.

Thereby, the cap preferably is made of the at least partially amorphous TPI such as the same material as the body. Like this, the X-ray can be provided through the cap as well as through the bottom portion of the body. This allows for processing the micro-vessel in a XRD or XPRD application when the sample micro-vessel is closed.

A further aspect of the invention relates to a method of analyzing solid form properties of a substance. The method comprises the steps of solidifying the substance; obtaining the solidified substance in one of a plurality of wells of a multi-well plate as described above; and analyzing the solidified substance in the well of the multi-well plate by preferably linear or quasi linear X-ray diffraction. The analysis comprises providing X-ray through the solidified substance and a bottom of the well and evaluating the X-ray which passed the solidified substance and the bottom of the well.

In this context, the term "linear" relates to providing the X-ray along a line which can be essentially straight.

The method according to the invention allows for efficiently implementing the effects and benefits described above in connection with the multi-well plate and its preferred embodiment.

Preferably, the one of the plurality of wells comprises a through hole and a sample micro-vessel having a body with a sidewall portion, a bottom portion and a hollow interior limited by the sidewall portion and the bottom portion, wherein the sample micro-vessel is arranged in the through hole, the bottom portion of the body of the sample micro-vessel is the bottom of the well and the substance is arranged in the sample micro-vessel while being solidified or prepared and while the solidified substance being analyzed by X-ray diffraction. Thereby, the micro-vessel can be arranged inside the at least one well when the substance is solidified or at another location. This allows for flexibly and efficiently performing preparation of samples and analysis thereof without requiring any decanting of the substance.

Preferably, the method comprises mixing a powder or other solid and a solvent or reagent such that a solution of the substance may result. Thereby, the powder or other solid and the solvent or reagent preferably are mixed in the sample micro-vessel. Like this, preparation of sample can efficiently be implemented, wherein dissolution is not required to be complete for a solution mediated solid form transformation.

Preferably, the method comprises closing the top of the well of the multi-well plate with a cap or a foil made of an at least partially amorphous thermoplastic polyimide before the solidified substance is analyzed. Like this, the substance as well as the environment around the micro-vessel can be protected during the process or at least certain steps thereof.

Preferably, the method comprises microscopically measuring the solidified substance in the well of the multi-well plate. Such microscopic measurement can provide additional information about the solidified substance. This can increase the quality of the analysis of the solidification.

Preferably, the method comprises drying the solidified substance in the at least one well of the multi-well plate. Thereby, it preferably additionally comprises analyzing the solidified substance in the well of the multi-well plate by X-ray diffraction before drying the solidified substance. Also, it preferably additionally or alternatively comprises analyzing the solidified substance in the well of the multi-well plate by X-ray diffraction after drying the solidified substance. Such analysis before and after the drying step can provide important further information about the behavior of the solidified substance.

Preferably, the method comprises storing the sample micro-vessel after the solidified substance is analyzed. Thereby, the sample micro-vessel preferably is stored in a storage multi-well plate. Such storing allows for reproducing and further evaluating the substance and the analysis thereof.

BRIEF DESCRIPTION OF THE DRAWINGS

The multi-well plate and the method according to the invention are described in more detail herein below by way of exemplary embodiments and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes includes various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
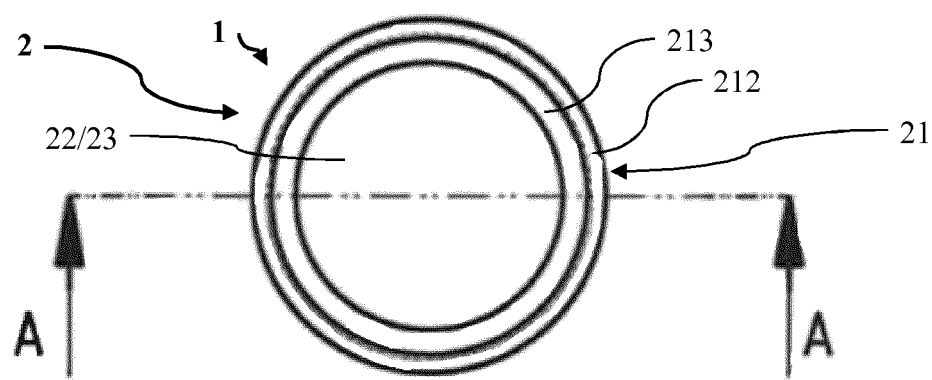
FIG. 1 shows a top view on a body of a first embodiment of a sample micro-vessel of a first embodiment of a multi-well plate according to the invention.

FIG. 1 shows a top view of a body 2 of an insert 1 as a sample micro-vessel suitable for a first embodiment of a multi-well plate according to the invention. The body 2 has a right circular sidewall portion 21 and a flat circular bottom portion 22. The sidewall portion 21 has an upper cap receiving section 213 and a protruding section 212 radially extending beyond the cap receiving section 213.

Figure 2:
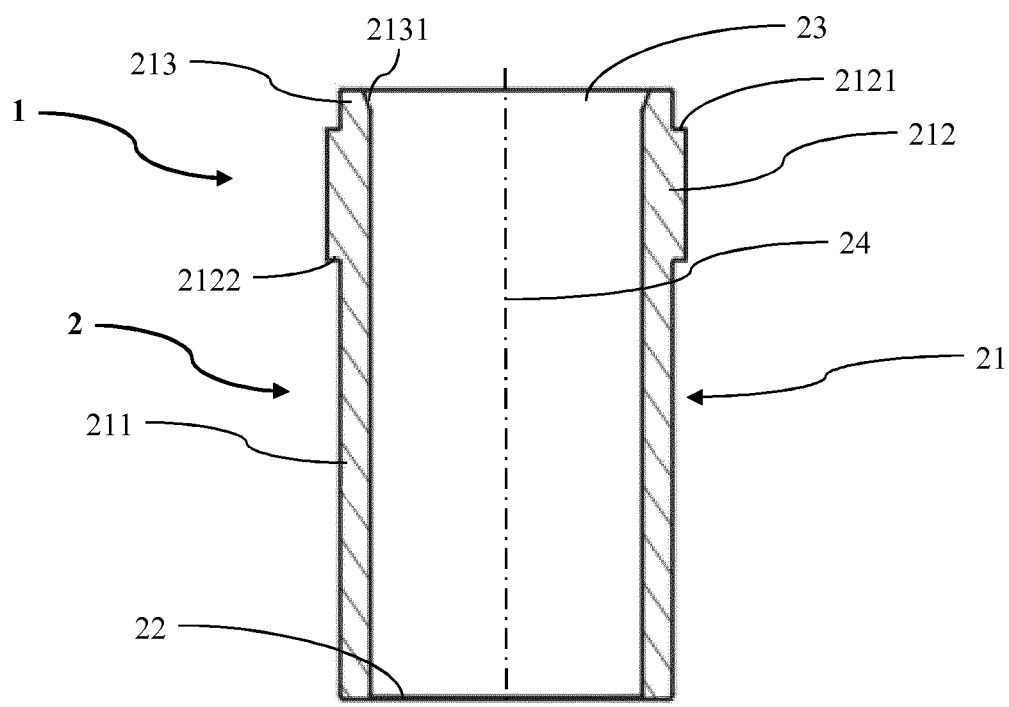
FIG. 2 shows a cross sectional view of the body of FIG. 1 along the line A-A of FIG. 1.

In FIG. 2 the body 2 is shown in a cross sectional side view. Thereby, it can be seen that the body 2 has an interior and that the bottom portion 22 is essentially perpendicular to the sidewall portion 21. At its inner side, the sidewall portion 21 is straight. Thus, in the interior of the body 2, the bottom portion 22 and the sidewall portion 21 form an essentially right angle.

The sidewall portion 21 further has a pipe like lower section 211. The protruding section 212 of the sidewall portion 21 laterally projects over the lower section 211 and the cap receiving section 213 to an identical extent. More particular, the lower section 211 abruptly passes over into the protruding section 212 thereby forming a lower step 2122 at the bottom end of the protruding section 212. Similarly, the cap receiving section 213 abruptly passes over into the protruding section 212 thereby forming an upper step 2121 at the top end of the protruding section 212. The lower step 2122 and the upper step 2121 each have a horizontal abutting surface wherein the abutting surface of the lower step 2122 is downwardly oriented and the abutting surface of the upper step 2121 is upwardly oriented.

The entire body 2 is rotational symmetric around a longitudinal axis 24. It is completely made of a preferably amorphous thermoplastic polyimide (TPI). The protruding section 212 is embodied in the sidewall portion 21 by varying its thickness in an axial direction. For example, in the embodiment shown in FIG. 1 and FIG. 2, a thickness of the sidewall portion 21 is 1 millimeter (mm) in the protruding section 212 and 0.7 mm outside the protruding section 212, i.e., in the cap receiving section 213 and the lower section 211. Thus, the protruding section 212 laterally projects over the lower section 211 and the cap receiving section 213 by 0.3 mm.

As can be seen in FIG. 2, the bottom portion 22 is comparably thin, for example, 0.05 mm thick. At its top end the body 2 has a free opening 23 wherein in the upper part of the cap receiving section 213 the interior is slightly expanding. Thus, the inner surface of the sidewall portion 21 has an outwardly tapering part 2131 at the opening 23. For example, the height of the body 2 amounts to about 14 mm wherein the cap receiving section 213 is about 0.9 mm thereof and the protruding section is about 3 mm thereof. The inner diameter of the body 2 is, e.g., about 6.25 mm and the outer diameter is about 8.25 mm at the protruding section 213 and about 7.4 mm outside the protruding section 213.

Figure 3:
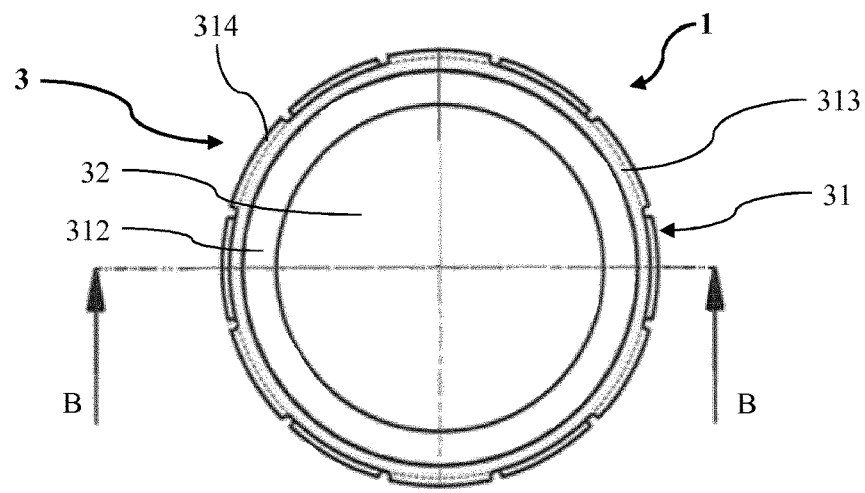
FIG. 3 shows a top view on a cap of the sample micro-vessel of FIG. 1.

FIG. 3 shows a top view of a cap 3 of the insert 1. The cap 3 has a sidewall portion 31 surrounding a circular window portion 32. The sidewall portion 31 has a right circular cylinder section 313 and plural gripping projections 314 outwardly extending from the cylinder section 313 at various heights. It further, includes a radial section 312 inwardly extending from the cylinder section 313.

Figure 4:
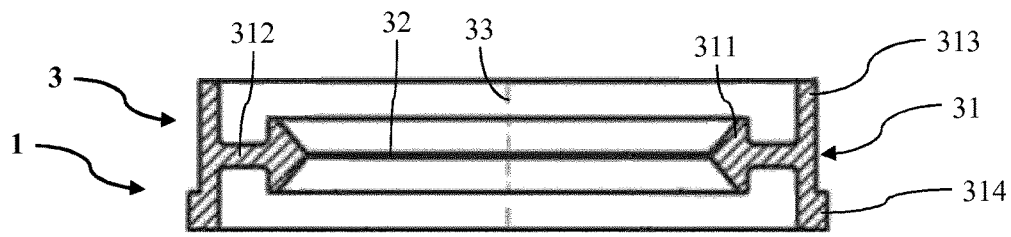
FIG. 4 shows a cross sectional view of the cap of FIG. 3 along the line B-B of FIG. 3.

In FIG. 4 the cap 3 is shown in a cross sectional side view. Thereby, it can be seen that the radial section 312 of the sidewall portion 31 of the cap 3 perpendicularly extends from the interior surface of its cylinder section 313. Thus, it horizontally extends. At its inner end, the radial section 312 passes over into an inwardly narrowing arrow section 311 which directly surrounds the window portion 32.

The entire cap 3 is one piece made of the TPI which is also used in the body 2. It has a vertical axis 33. The window portion 32 is comparably thin, for example, it has a thickness of about 0.05 mm. The whole cap has a height of about 2 mm, for example. An inner diameter of the cylinder section 313 of the sidewall portion 31 corresponds to the outer diameter of the cap receiving section 213 of the sidewall portion 21 of the body 2. For example, it is about 7.8 mm which is about 0.2 mm bigger than the outer diameter of the cap receiving section 213. Since the arrow section 311 at its lateral end side is higher than the radial section 312 it axially or vertically projects over the radial section 312 in an upward and downward direction. Thereby, the outer side of the arrow section 311 forms together with the top and bottom sides of the radial section 312 and the inner side of the cylinder section 313 a body recess.

Figure 5:
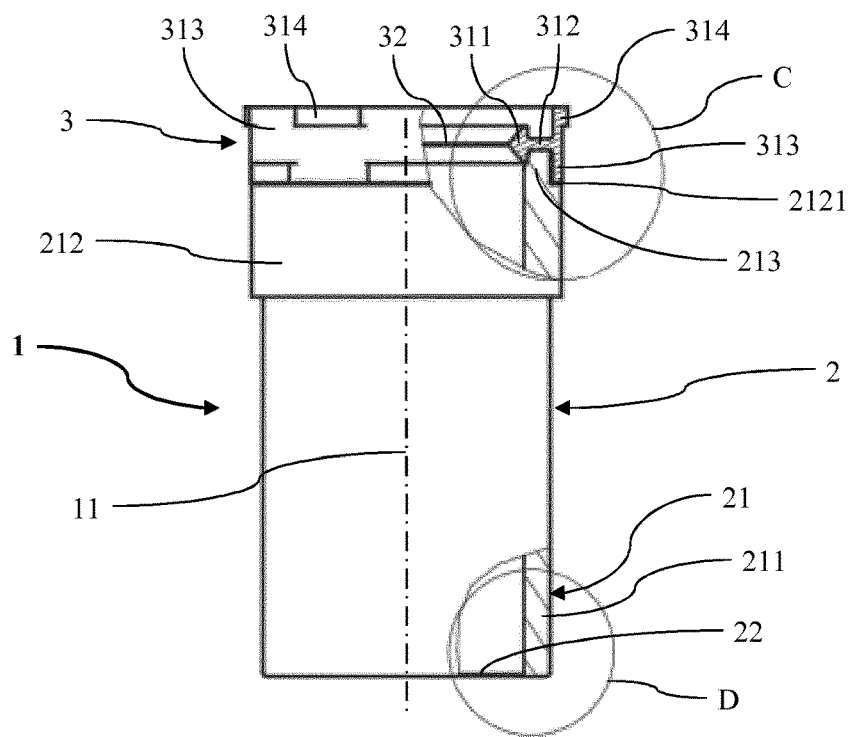
FIG. 5 shows a side and partially cross sectional view of the sample micro-vessel of FIG. 1.

FIG. 5 shows the complete insert 1 wherein the cap 3 is mounted onto the body 2. The axis 24 of the body 2 together with the axis 33 of the cap 3 form an axis 11 of the insert 1. Thereby, the cap receiving section 213 of the sidewall portion 21 of the body 2 is arranged in the body recess of the cap 3. In more detail, the top end of the cap receiving section 213 abuts the bottom side of the radial section 312 of the sidewall portion 31 of the cap 3 and the upper step 2121 of the protruding section 212 of the sidewall portion 21 of the body 2 abuts the bottom end of the cylinder section 313 of the sidewall portion 31 of the cap 3.

Figure 6:
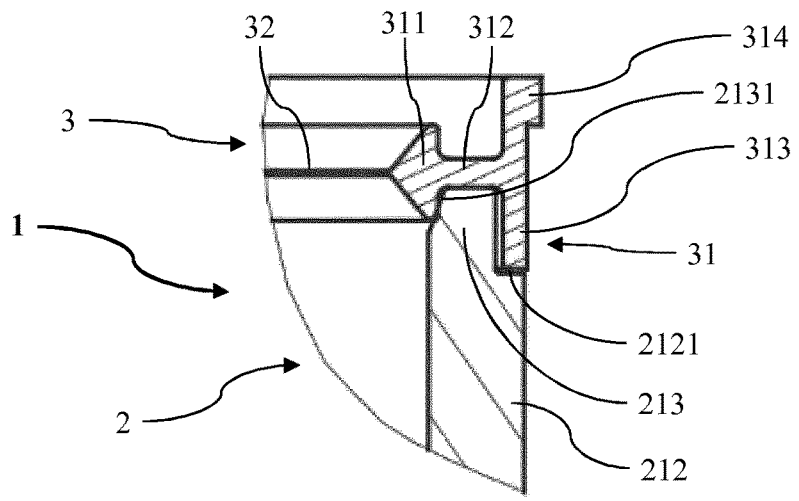
FIG. 6 shows detail C of FIG. 5.
Figure 7:
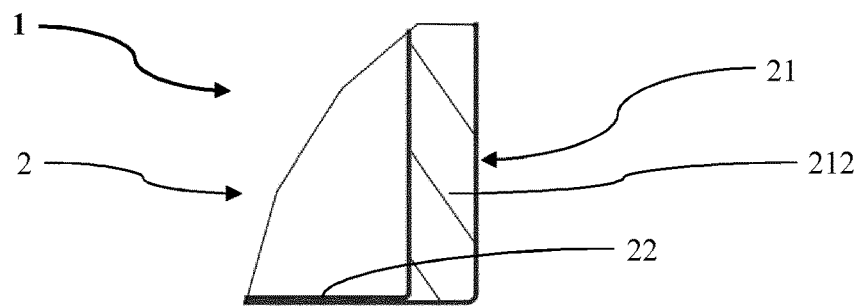
FIG. 7 shows detail D of FIG. 5.

In FIG. 6 and FIG. 7 sections of the insert 1 are shown in more detail. Thereby, it can be seen that the vertical outer side of the arrow section 311 of the cap 3 abuts the tapering part 2131 of the inner surface of the sidewall portion 21. When the cap 3 and the body 2 are pressed together, the arrow section 311 slides along the inclined surface of the tapering part 2131 such that the cap 3 or a specific section thereof is slightly deformed. Like this, the cap 3 can tightly close the body 2.

Figure 8:
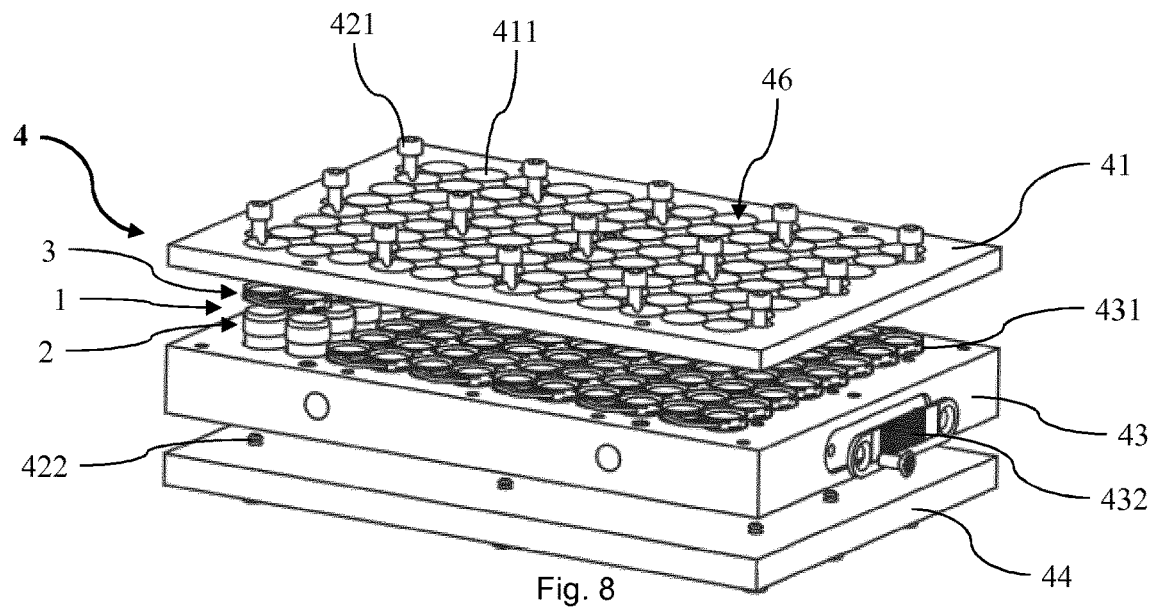
FIG. 8 shows an exploded perspective view of the first embodiment of a multi-well plate according to the invention equipped with sample micro-vessels identical to the sample micro-vessels of FIG. 1 in a preparing arrangement.
Figure 9:
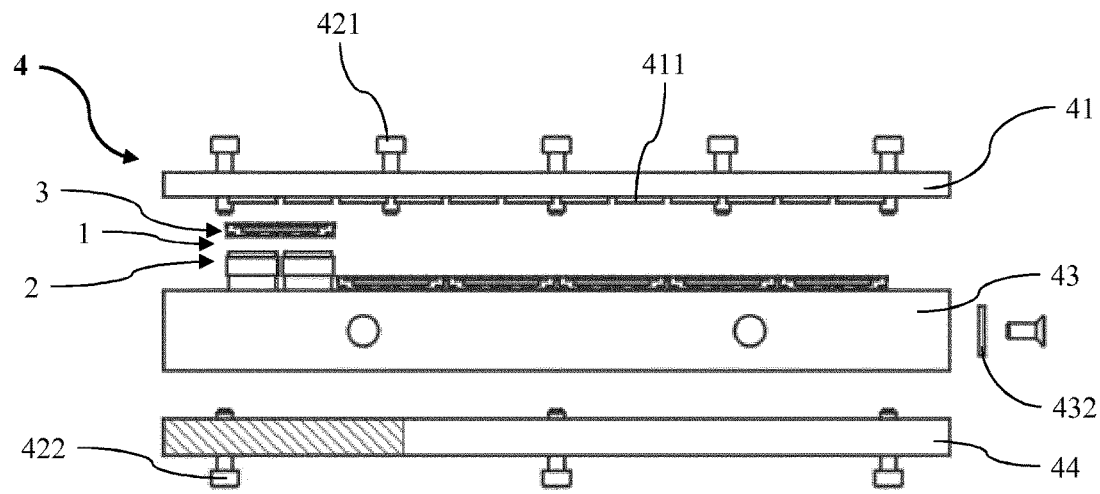
FIG. 9 shows an exploded side view of the multi-well plate of FIG. 8.

FIG. 8 and FIG. 9 show the first embodiment of a multi-well plate 4 according to the invention. The multi-well plate 4 comprises a cover plate 41, a main plate 43 and, in the preparing arrangement of the multi-well plate shown in FIGS. 8-12, a solid plate 44. The main plate 43 is equipped with a label 432 mounted to a cross side. The solid plate 44 is screwed bottom up to the main plate 43 by means of screws 422. Then the cover plate 41 is screwed top down to the main plate 43 by means of screws 421.

Figure 10:
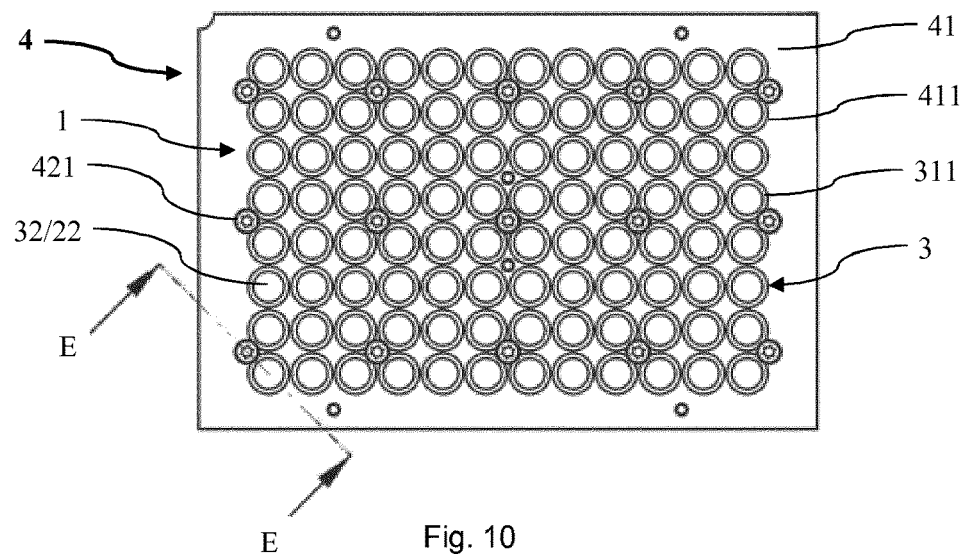
FIG. 10 shows a top view of the multi-well plate of FIG. 8.

As can be best seen in FIG. 10, the multi-well plate 4 has ninety-six wells comprising bores 46 in the cover plate 41 and bores 46 in the main plate 43. The wells are arranged in eight rows each having twelve wells. Turning back to FIG. 8 and FIG. 9, each well has one insert 1 wherein the bottom portion 22 of the body 2 of the insert 1 forms the bottom of the well. Thus, each well of the multi-well plate is formed by two corresponding bores 46 and one of the inserts 1. The bottoms 22 of the wells are made of the preferably amorphous thermoplastic polyimide. Each of the bodies 2 is provided with one cap 3 of the insert 1 wherein the caps 3 are grouped to handling units having two rows each with eight caps 3 connected together.

Figure 11:
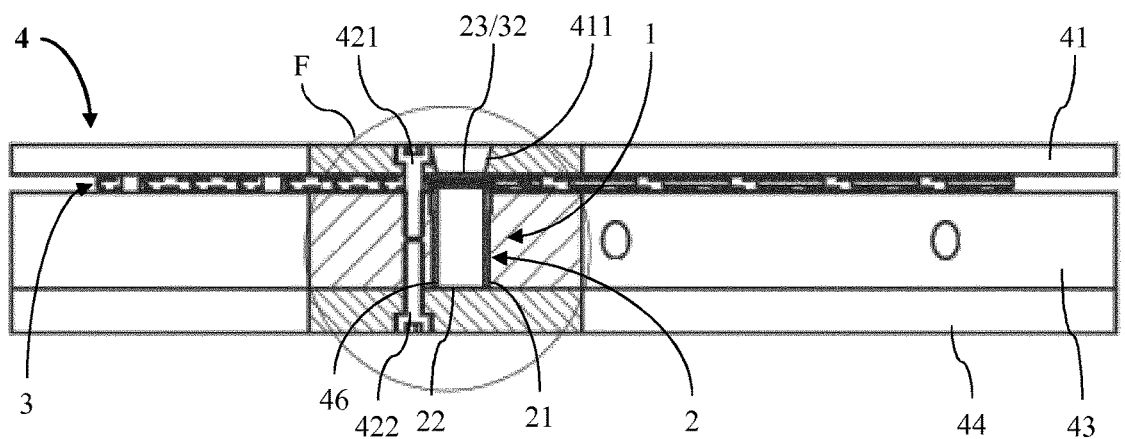
FIG. 11 shows a cross sectional view of the multi-well plate of FIG. 8 along the line E-E of FIG. 10.
Figure 12:
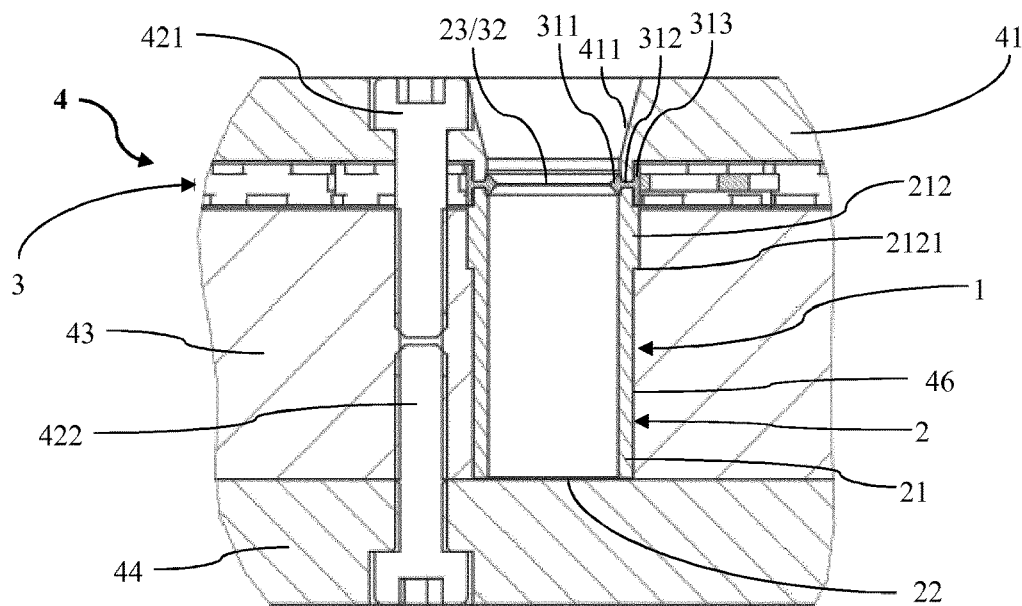
FIG. 12 shows detail F of FIG. 11.

As can be seen in FIG. 11 and FIG. 12 in more detail each of the bores in the main plate 43 is shaped to receive and hold one of the inserts 1. In the main plate 43 the bores 46 have dimensions fitting to the inserts 1. Particularly, the inner surfaces of the bores 46 are adapted to mate to the outer surfaces of the inserts 1. In more detail, the bores 46 in the main plate 43 have widened upper ends to receive the protruding sections 212 of the bodies 2 of the inserts 1. Thereby, the widened upper ends have horizontal contact surfaces which abut the lower surfaces 2121 of the protruding sections 212.

In the cover plate 41 the bores 46 forming the wells are downwardly tapering. In particular, in the cover plate 41 the bores have inclined inner side surfaces 411 which form a conus angle of about 30°. Such conical shape gives space to X-ray irradiation. Furthermore, the cover plate 41 presses the caps 3 on the bodies 2 such that the inserts 1 are tightly closed.

Figure 13:
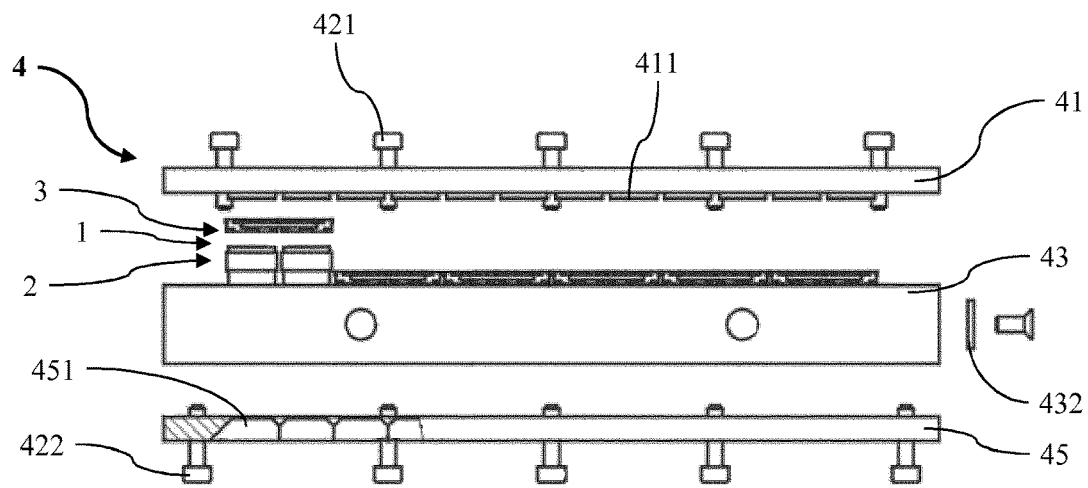
FIG. 13 shows an exploded side view of the multi-well plate of FIG. 8 in an analyzing arrangement.
Figure 14:
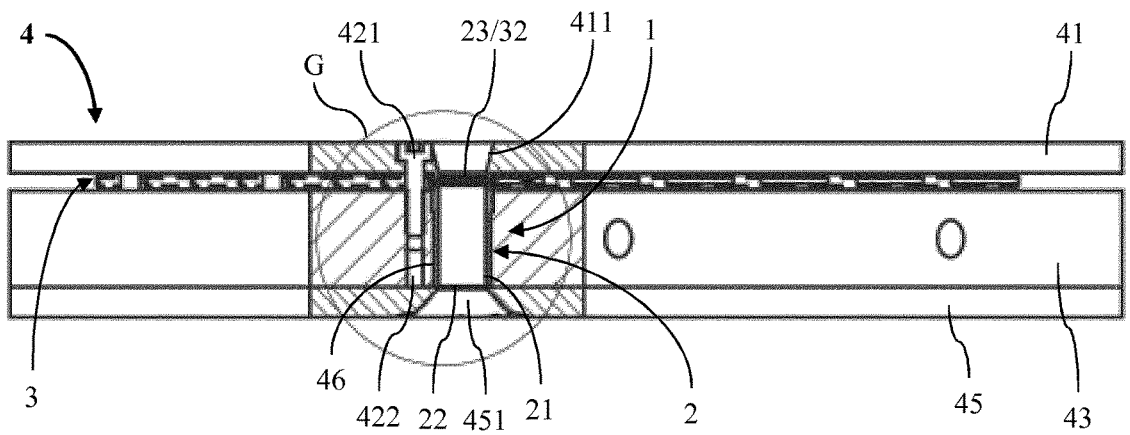
FIG. 14 shows a cross sectional view of the multi-well plate of FIG. 13 along the line E-E of FIG. 10.
Figure 15:
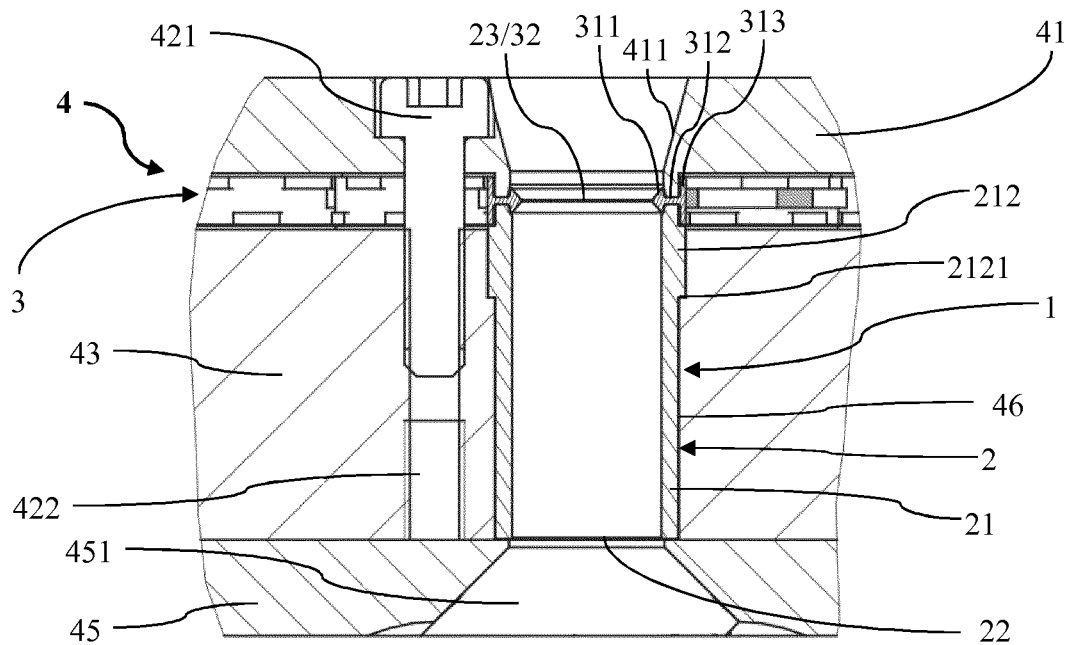
FIG. 15 shows detail G of FIG. 14.

In contrast to FIGS. 8-12, in which the multi-well plate is shown in a preparing arrangement, FIGS. 13-15 show the multi-well plate 4 in an analyzing arrangement. In particular, instead of the solid plate 43 an aperture plate 45 is screwed bottom up to the main plate 43 by means of the screws 422. The aperture plate 45 comprises a plurality of conical bores 451 which are downwardly widening. The bores 451 are arranged at the aperture plate 45 such that each well is equipped with one of the bores 451.

The multi-well plate 4 can specifically be used for analyzing solid form or crystallization properties of substances in an embodiment of a method according to the invention. Thereby, for preparing the substances powders, solvents and reagents are provided into the bodies 2 of the inserts 1 which are positioned in the bores 46 of the multi-well plate 4 in its preparing arrangement. More particularly, the solid plate 44 is screwed bottom up to the main plate 43 and the bodies 2 of the inserts 1 are positioned top down into the bores 46. Then, the powders and solvents are provided into the bodies 2 and the caps 3 are placed onto the bodies 2. Finally, the cover plate 41 is screwed top down to the main plate 43 such that the caps 3 are pressed onto the bodies 2 and, thereby, the inserts 1 are tightly closed.

Inside the inserts 1 the powder and the solvent are mixed and prepared such that the substances result in a solid form. For example, the substances can be crystallized inside the inserts 1. Such preparing may include equilibration for example by the help of a stirrer, cooling, anti-solvent addition, lyophilizing, reactive crystallization, precipitation or evaporation.

After solidification or preparation, the solid plate 44 is replaced by the aperture plate 45 resulting in the multi-well plate 4 being in its analyzing arrangement. Then, the moist solidified substances are analyzed by preferably transmission X-ray diffraction. In particular, an X-ray beam is provided from an appropriate source above the cover plate 41 into the wells through the solidified substances and the bottoms 22 and out of the bores 451 of the aperture plate 45. For allowing to completely illuminate the whole wells by the X-ray beam having a line focus, the multi-well plate 4 is rotated (+/− approx. 180°). To further reduce statistical effects on the intensity distribution the wells are tilted to a max. of 15° during the measurement. As mentioned above, the inclined surfaces 411 of the bores of the cover plate 41 allow for preventing to shade the wells.

Below the multi-well plate 4 a detector is arranged which detects the X-ray passing the bottoms 22 of the wells. The detected X-ray is then evaluated and conclusions about the solid form properties of the solidified substances are drawn. Additionally, the moist crystallized substances inside the inserts 1 are microscopically measured for gathering further information.

Then, the system is prepared for a drying step which includes removing the caps 3 from the bodies 2 for allowing evaporation. The crystallized substances are dried and the caps 3 are mounted to the bodies again. Thereafter, the dried solid substances are analyzed by preferably transmission X-ray diffraction and microscopic inspection again.

Figure 16:
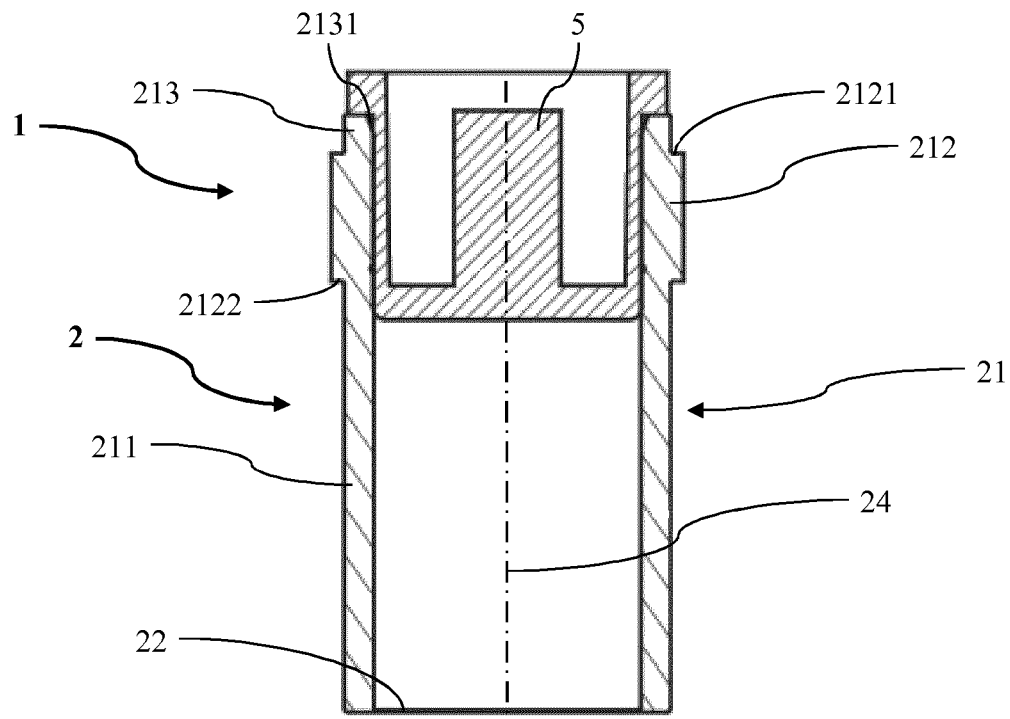
FIG. 16 shows a cross sectional view of the body of FIG. 1 equipped with a stopper.

After analyzing the substances, the inserts 1 can be rearranged in accordance with the results of the analysis. As shown in FIG. 16 the inserts 1 are then tightly closed. In particular, the caps 3 are removed from the bodies 2 and, instead, elastic stoppers 5 are pressed top in the bodies 2. Like this, the inserts 1 are tightly closed. Then, the inserts 1 are positioned in a storage multi-well plate where they can be stored.

Figure 17:
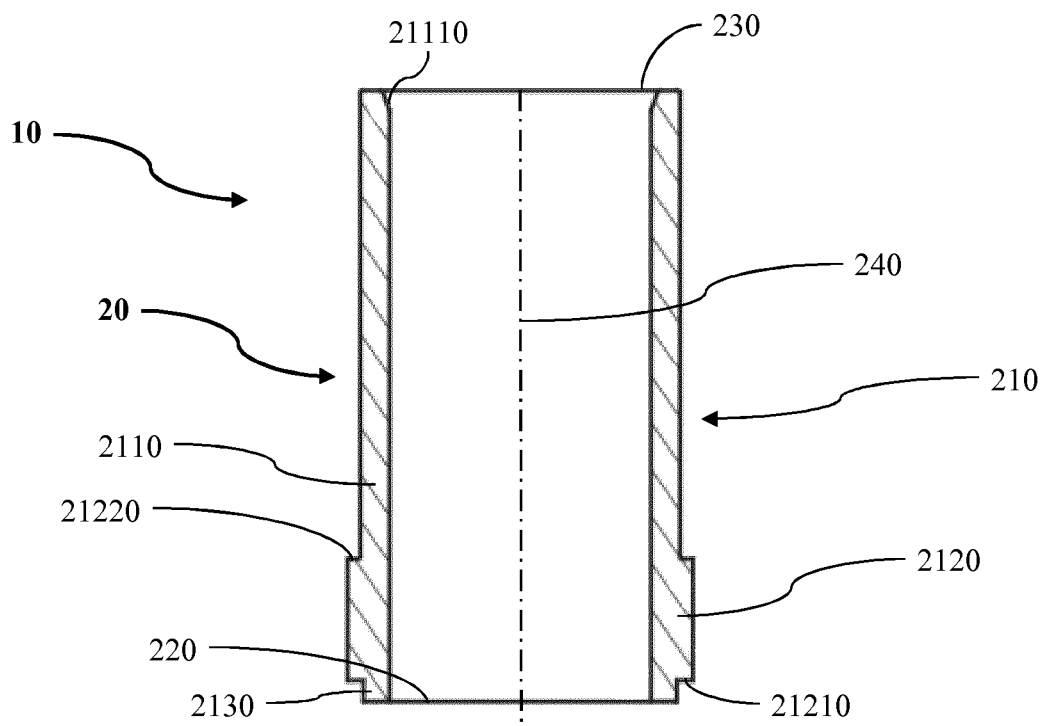
FIG. 17 shows a cross sectional view of a body of a second embodiment of a sample micro-vessel of a second embodiment of a multi-well plate according to the invention.

FIG. 17 shows a cross-sectional side view of a body 20 of an insert 10 as a second embodiment of a sample microvessel suitable for a second embodiment of a multi-well plate 40 according to the invention. The body 20 has a right circular essentially cylindrical sidewall portion 210. The sidewall portion 210 has an upper pipe section 2110, a protruding section 2120 radially extending beyond the pipe section 2110. Below the protruding section 2120 the body 20 has a seal receiving section 2130 which has the identical diameter and thickness as the pipe section 2110.

The body 20 has an interior and, at its inner side, the sidewall portion 210 is straight. The protruding section 2120 of the sidewall portion 210 laterally projects over the pipe section 2110 and the seal receiving section 2130 to an identical extent. More particular, the seal receiving section 2130 abruptly passes over into the protruding section 2120 thereby forming a lower step 21210 at the bottom end of the protruding section 2120. Similarly, the pipe section 2110 abruptly passes over into the protruding section 2120 thereby forming an upper step 21220 at the top end of the protruding section 2120. The lower step 21210 and the upper step 21220 each have a horizontal abutting surface wherein the abutting surface of the lower step 21210 is downwardly oriented and the abutting surface of the upper step 21220 is upwardly oriented.

The entire body 20 is rotational symmetric around a longitudinal axis 240. It is preferably made of a preferably amorphous thermoplastic polyimide (TPI). The protruding section 2120 is embodied in the sidewall portion 210 by varying its thickness in an axial direction. At its top end the body 20 has a free upper opening 230 wherein in the uppermost part of the pipe section 2110 the interior is slightly expanding. Thus, the inner surface of the sidewall portion 210 has an outwardly tapering part 21110 at the opening 230. At its bottom end the body 20 has a free lower opening 220.

Figure 18:
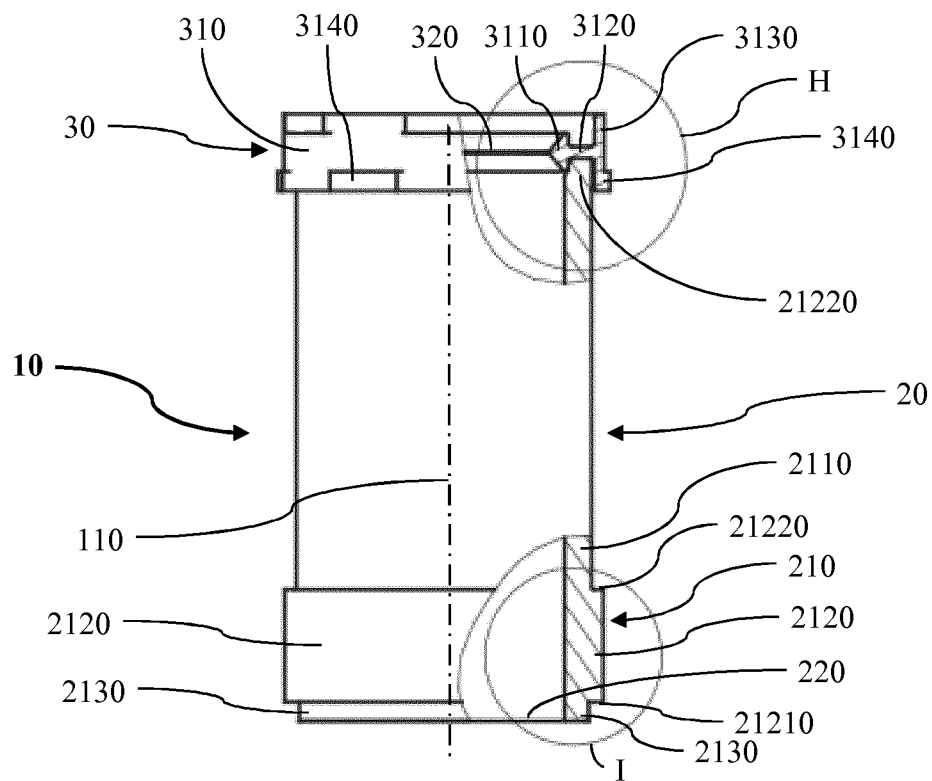
FIG. 18 shows a side and partially cross sectional view of the sample micro-vessel of FIG. 17.

FIG. 18 shows the complete insert 10 wherein a cap 30 is mounted onto the body 20. The cap 30 is identically shaped as the cap 3 of the first embodiment of the insert 1 shown in FIG. 3 and FIG. 4. It has a sidewall portion 310 surrounding a circular window portion 320. The sidewall portion 310 has a right circular cylinder section 3130 and plural gripping projections 3140 outwardly extending from the cylinder section 3130 at various heights. It further, includes a radial section 3120 inwardly extending from the cylinder section 3130. The radial section 3120 of the sidewall portion 310 of the cap 30 perpendicularly extends from the interior surface of its cylinder section 3130. At its inner end, the radial section 3120 passes over into an inwardly narrowing arrow section 3110 which directly surrounds the window portion 320.

The entire cap 30 is one piece made of the preferably amorphous TPI which is also used in the body 20. The window portion 320 is comparably thin and an inner diameter of the cylinder section 3130 of the sidewall portion 310 corresponds to the outer diameter of the pipe section 2110 of the sidewall portion 210 of the body 20. Since the arrow section 3110 at its lateral end side is higher than the radial section 3120 it axially or vertically projects over the radial section 3120 in an upward and downward direction. Thereby, the outer side of the arrow section 3110 forms together with the top and bottom sides of the radial section 3120 and the inner side of the cylinder section 3130 a body recess.

The axis 240 of the body 20 together with an axis of the cap 30 form an axis 110 of the insert 10. Thereby, the pipe section 2110 of the sidewall portion 210 of the body 20 is partially arranged in the body recess of the cap 30. In more detail, the top end of the pipe section 2110 abuts the bottom side of the radial section 3120 of the sidewall portion 310 of the cap 30.

Figure 19:
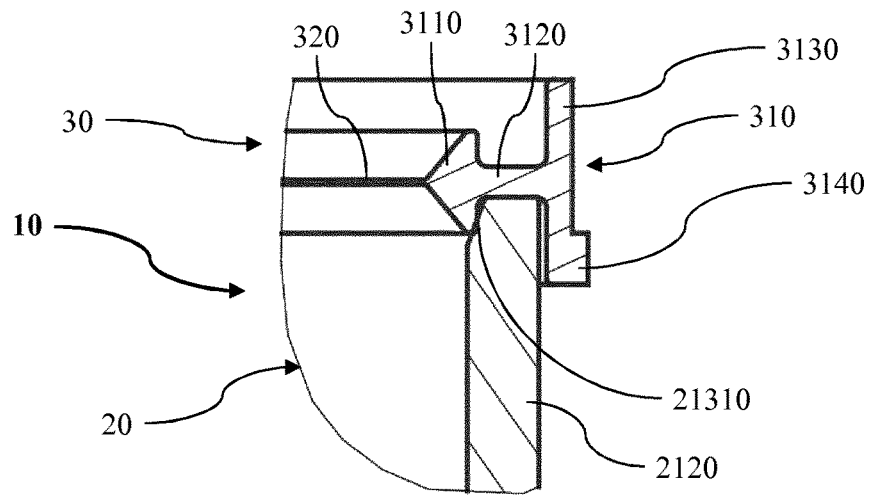
FIG. 19 shows detail H of FIG. 18.
Figure 20:
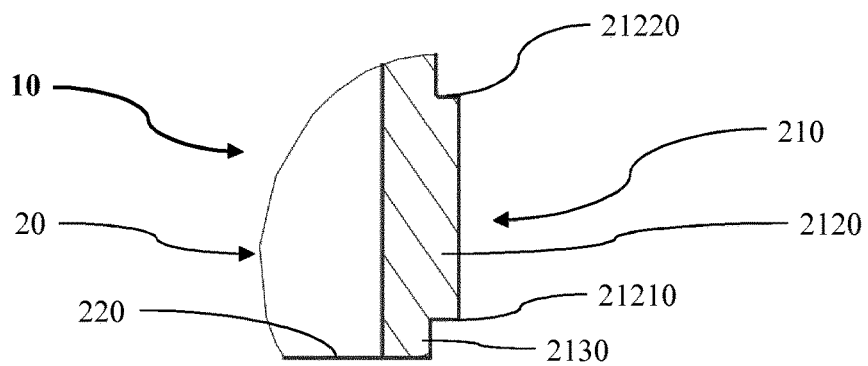
FIG. 20 shows detail I of FIG. 18.

In FIG. 19 and FIG. 20 sections of the insert 10 are shown in more detail. Thereby, it can be seen that the vertical outer side of the arrow section 3110 of the cap 30 abuts the tapering part 21110 of the inner surface of the sidewall portion 210. When the cap 30 and the body 20 are pressed together, the arrow section 3110 slides along the inclined surface of the tapering part 21110 such that the cap 30 or a specific section thereof is slightly deformed. Like this, the cap 30 can tightly close the body 20.

Figure 21:
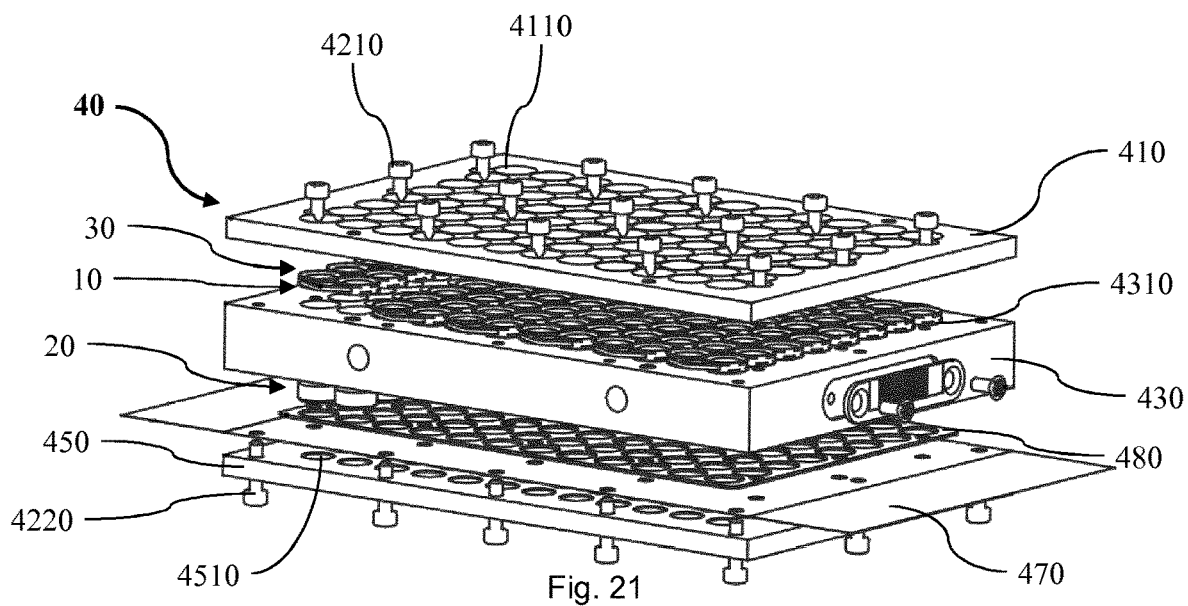
FIG. 21 shows an exploded perspective view of the second embodiment of a multi-well plate according to the invention equipped with sample micro-vessels identical to the sample micro-vessel of FIG. 17 in an analyzing arrangement.
Figure 22:
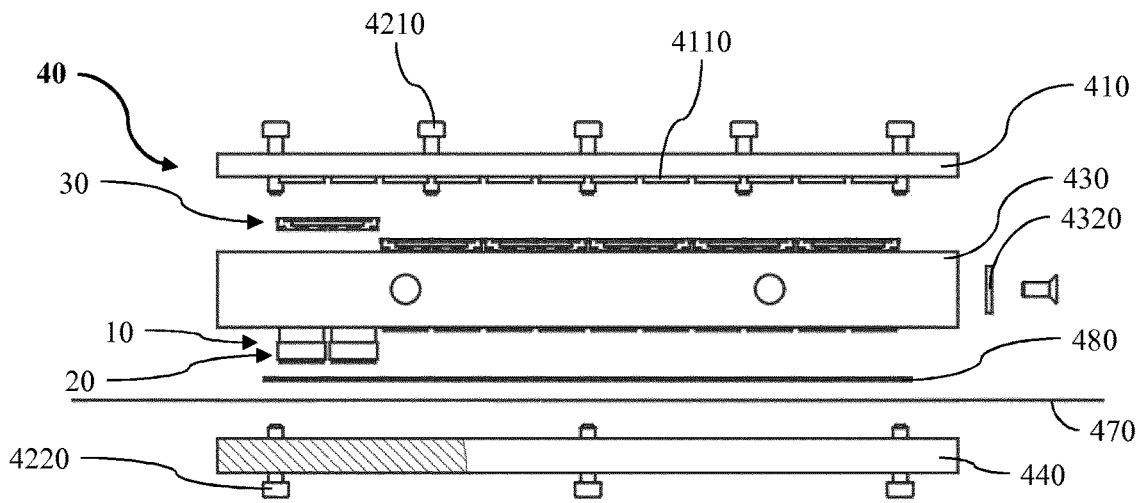
FIG. 22 shows an exploded side view of the multi-well plate of FIG. 21.

FIG. 21 and FIG. 22 show the second embodiment of the multi-well plate 40 according to the invention. The multi-well plate 40 comprises a cover plate 410, a main plate 430, a sealing mat 480, a foil sheet 470 as well as, in the analyzing arrangement of the multi-well plate shown in FIG. 21, FIG. 26, FIG. 27 and FIG. 28, an aperture plate 450 and, in the preparing arrangement of the multi-well plate shown in FIG. 22, FIG. 24 and FIG. 25, a solid plate 440. The main plate 430 is equipped with a label 4320 mounted to a cross side. The solid plate 440 can be screwed bottom up to the main plate 430 by means of screws 4220 thereby clamping the sealing mat 480 and the foil sheet 470 to the main plate 430. Then the cover plate 410 can be screwed top down to the main plate 430 by means of screws 4210.

Figure 23:
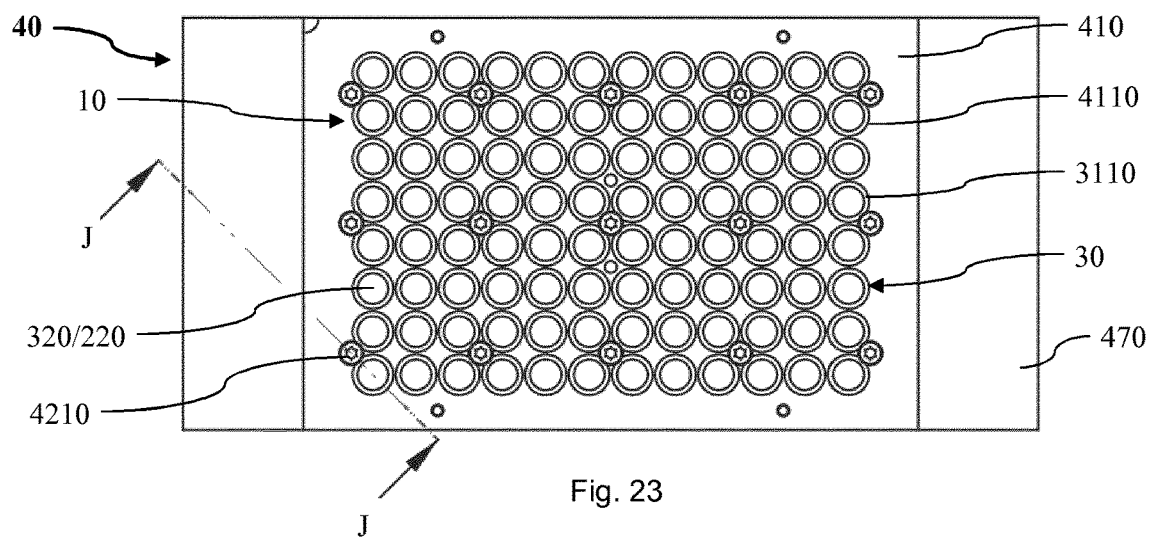
FIG. 23 shows a top view of the multi-well plate of FIG. 21.

As can be best seen in FIG. 23, the multi-well plate 40 has plural wells formed by bores 4110 in the cover plate 410 and bores 460 in the main plate 430. Turning back to FIG. 21 and FIG. 22, each well has one insert 10 wherein the seal receiving section 2130 of its body 20 projects through a respective opening in the seal mat 480.

Figure 24:
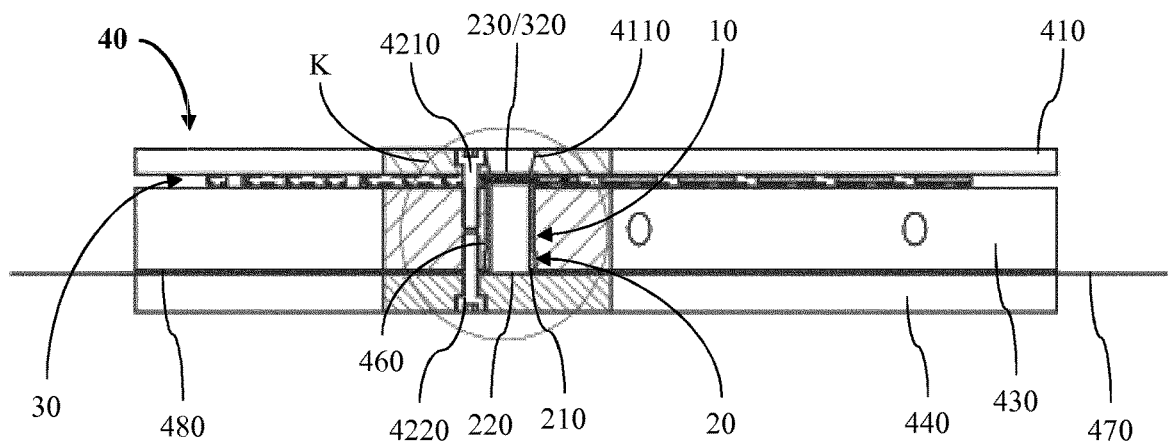
FIG. 24 shows a cross sectional view along the line J-J of FIG. 23.

As shown in FIG. 24, the lower ends 220 of the bodies 20 of the inserts 10 are closed by the foil sheet 470 which is completely made of a thermoplastic polyimide. Like this, the foil sheet 470 forms the bottoms of each one of the wells. Thus, the bottoms of the wells are made of the preferably amorphous TPI. Each of the bodies 20 is provided with one cap 30 wherein the caps 30 are grouped to handling units.

Figure 25:
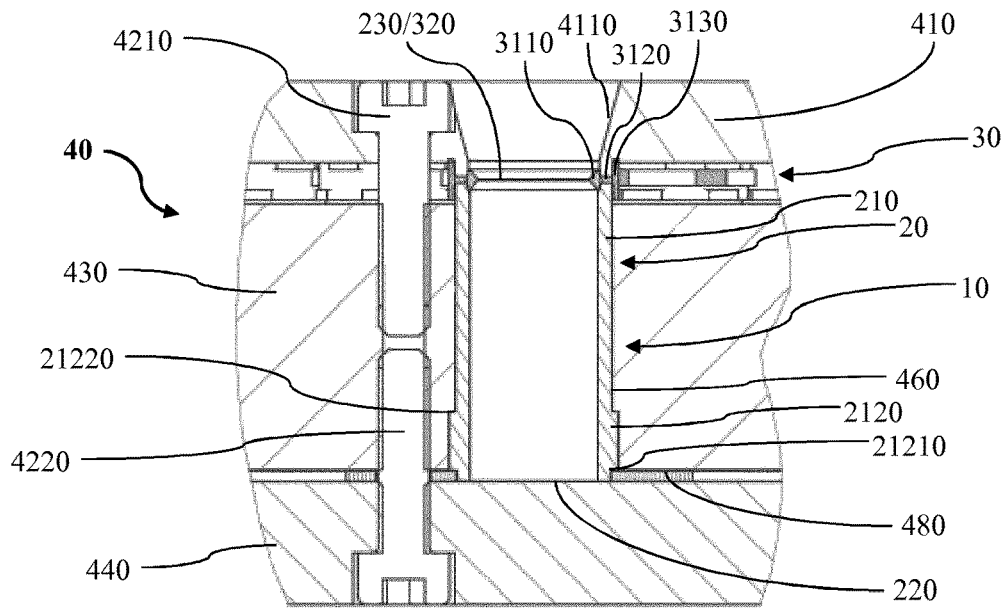
FIG. 25 shows detail K of FIG. 24.

As can be seen in FIG. 25 in more detail, each of the bores 460 of the wells is shaped to receive and hold one of the inserts 10. In the main plate 430 the bores 460 have dimensions fitting to the inserts 10. Particularly, the inner surfaces of the bores 460 are adapted to mate to the outer surfaces of the inserts 10. In more detail, the bores 460 in the main plate 430 have widened lower ends to receive the protruding sections 2120 of the bodies 20 of the inserts 10. Thereby, the widened lower ends have horizontal contact surfaces which abut the lower surfaces 21210 of the protruding sections 2120.

In the cover plate 410 the wells are downwardly tapering. In particular, in the cover plate 410 the wells 460 have inclined inner side surfaces 4110 which form a conus angle. Such conical shape gives space to X-ray irradiation. Furthermore, the cover plate 410 presses the caps 30 on the bodies 20 such that the inserts 10 are tightly closed.

Figure 26:
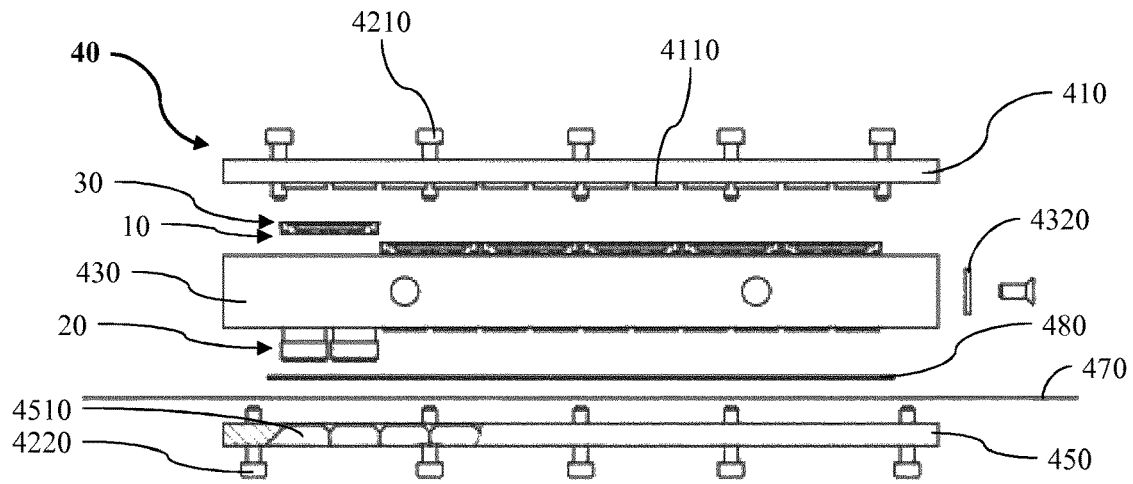
FIG. 26 shows an exploded side view of the multi-well plate of FIG. 21 in an analyzing arrangement.
Figure 27:
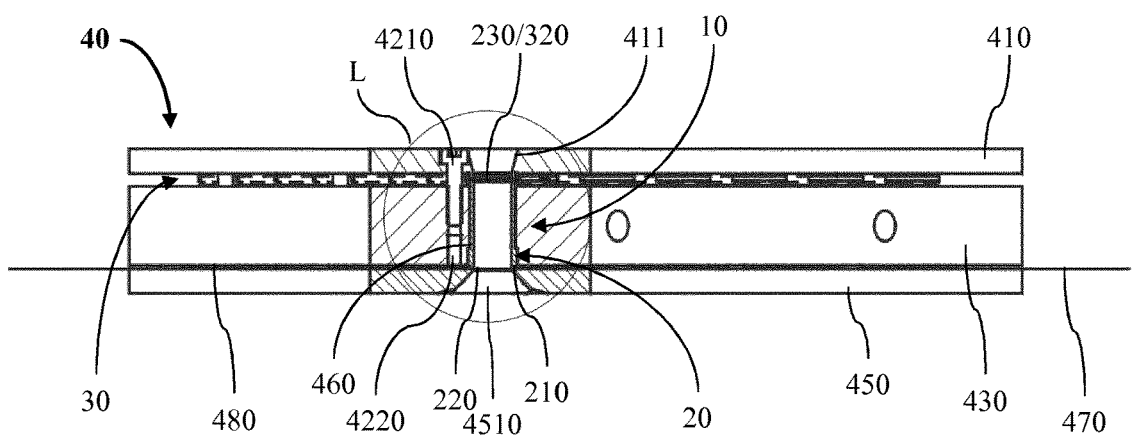
FIG. 27 shows a cross sectional view of the multi-well plate of FIG. 26 along the line J-J of FIG. 23.
Figure 28:
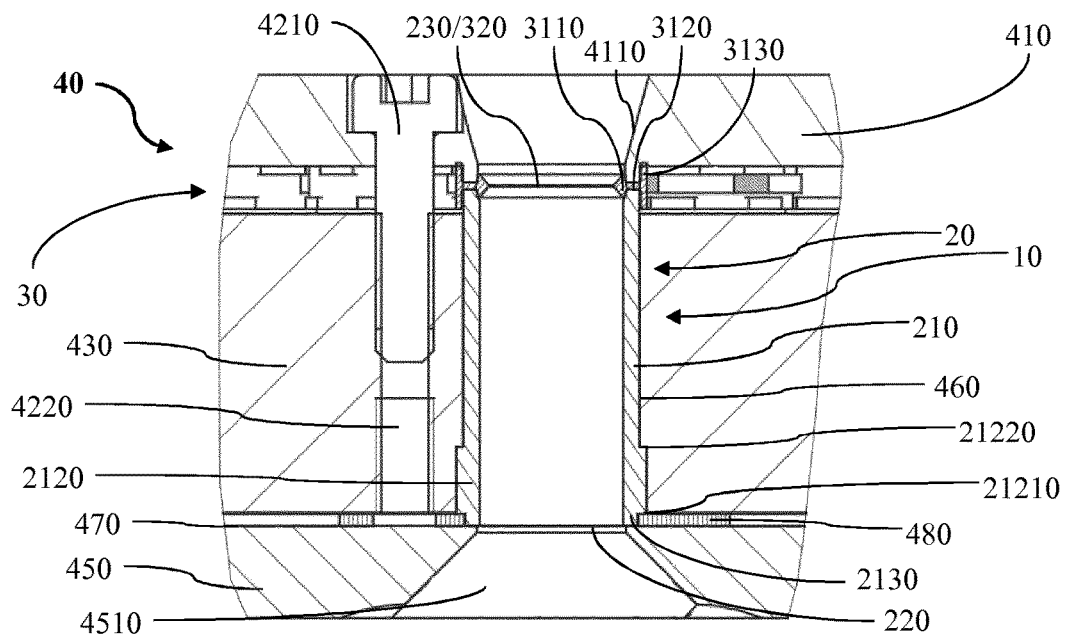
FIG. 28 shows detail L of FIG. 27.

In contrast to FIG. 22, FIG. 24 and FIG. 25, in which the multi-well plate 40 is shown in a preparing arrangement, FIGS. 26-28 show the multi-well plate 40 in an analyzing arrangement. In particular, instead of the solid plate 440 the aperture plate 450 is screwed bottom up to the main plate 430 by means of the screws 4220. The aperture plate 450 comprises a plurality of conical bores 4510 which are downwardly widening. The bores 4510 are arranged at the aperture plate 450 such that each well is equipped with one of the bores 4510.

The multi-well plate 40 can be used for analyzing solid form or crystallization properties of substances in the embodiment of a method according to the invention described above in connection with the first embodiment of a multi-well plate 4.

Figure 29:
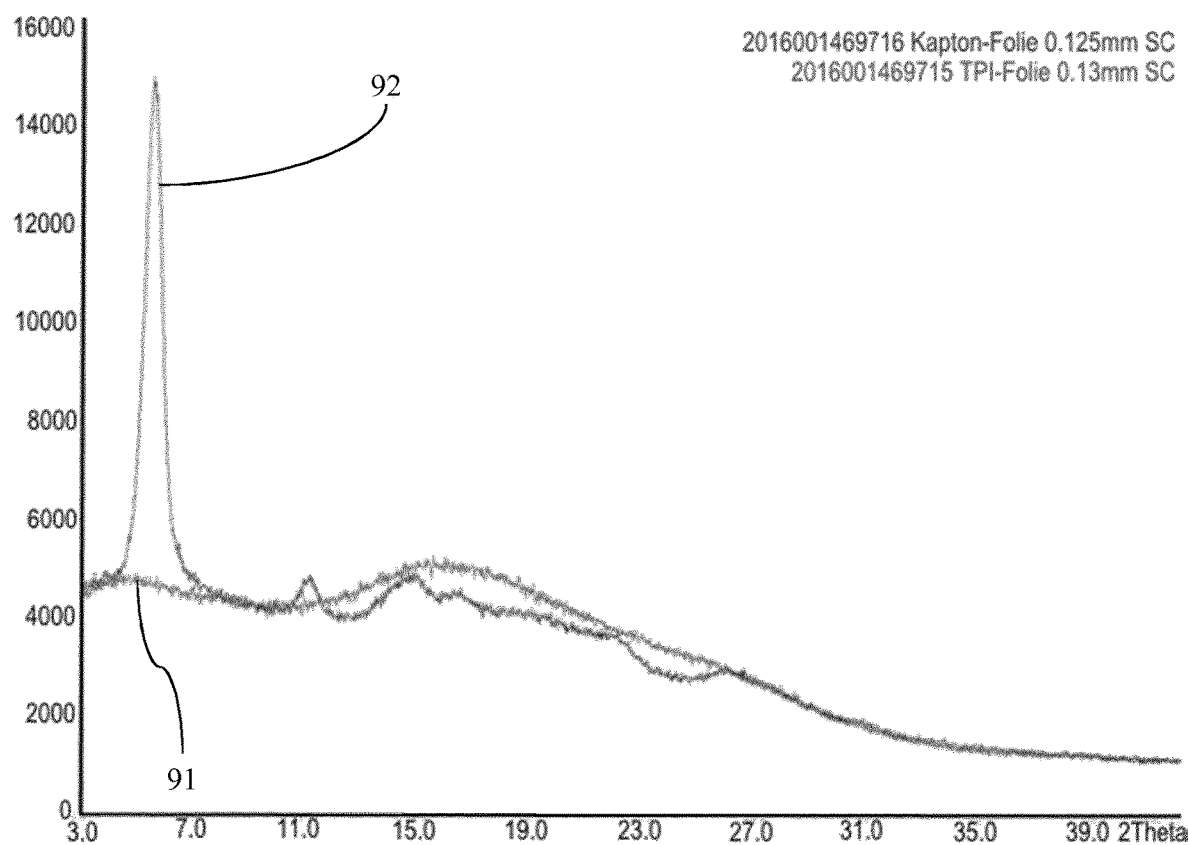
FIG. 29 shows a graphic of the background characteristics of thermoplastic polyimide compared to a conventional polyimide, i.e. poly (4,4'-oxydiphenylene-pyromellitimide).

FIG. 29 shows graphs of measurement results of the background characteristics of thermoplastic polyimide (TPI) and of poly (4,4'-oxydiphenylene-pyromellitimide) which is known in the art under the trademark Kapton. More particularly, in the example shown in FIG. 29 background properties of a 0.13 mm thick foil made of TPI are compared to background properties of a 0.125 mm thick foil made of Kapton. Thereby, the TPI graph 91 and a Kapton graph 92 result each showing the measurement results of the respective foil.

As can be derived from FIG. 29 the TPI foil is X-ray amorphous and shows no characteristic peaks as Kapton foil does. Due to the absence of such broad peaks in comparison to Kapton foil, the TPI foil is essentially better suitable for analytical applications. In addition, it consists of the same low X-ray background properties comparable to Kapton foil and also provides the same good stability properties for preparation/protection purposes for analytical testing.

This description and the accompanying drawings that illustrate aspects and embodiments of the present invention should not be taken as limiting the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the FIGS. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A multi-well plate comprising:
a plurality of wells, wherein at least one of the plurality of wells comprises a through hole and a sample micro-vessel, and
wherein the sample micro-vessel
has a body with a sidewall portion, a bottom portion and a hollow interior limited by the sidewall portion and the bottom portion,
is made of a thermoplastic polyimide, and
the body of the sample micro-vessel is arranged in the through hole of the at least one of the plurality of wells such that the bottom portion of the body of the sample micro-vessel defines a bottom of the at least one of the plurality of wells being made of the thermoplastic polyimide.

2. The multi-well plate of claim 1, wherein the bottom of the at least one of the plurality of wells has a thickness of about 200 micrometer or less, of about 150 micrometer or less, of about 100 micrometer or less, of about 50 micrometer or less or of about 25 micrometer or less.

3. The multi-well plate of claim 1, wherein in the at least one of the plurality of wells the through hole has a structured inner surface and the body of the sample micro-vessel has a correspondingly structured outer surface such that the sample micro-vessel is held in the through hole.

4. The multi-well plate of claim 1, wherein in the at least one of the plurality of wells the sample micro-vessel comprises a cap configured to be arranged on the body to close the interior of the body.

5. The multi-well plate of claim 4, wherein the cap of the sample micro-vessel is made of the thermoplastic polyimide.

6. A method of analyzing solid form properties of a substance, comprising:
solidifying the substance;
obtaining the solidified substance in one of a plurality of wells of a multi-well plate according to claim 1; and
analyzing the solidified substance in the well of the multi-well plate by preferably transmission X-ray diffraction comprising
providing X-ray through the solidified substance and a bottom of the well, and
evaluating the X-ray which passed the solidified substance and the bottom of the well.

7. The method of claim 6, wherein the one of the plurality of wells comprises a through hole and a sample micro-vessel having a body with a sidewall portion, a bottom portion and a hollow interior limited by the sidewall portion and the bottom portion, wherein the sample micro-vessel is arranged in the through hole, the bottom portion of the body of the sample micro-vessel is the bottom of the well and the substance is arranged in the sample micro-vessel while being solidified and while the solidified substance being analyzed by preferably transmission X-ray diffraction.

8. The method of claim 7, further comprising mixing a powder or other solid and a solvent or other reagent such that a solution of the substance results, wherein the powder or other solid and the solvent or other reagent are mixed in the sample micro-vessel.

9. The method of claim 6, further comprising mixing a powder or other solid and a solvent or other reagent such that a solution of the substance results.

10. The method of claim 6, further comprising closing the top of the well of the multi-well plate with a cap or a foil made of a thermoplastic polyimide before the solidified substance is analyzed.

11. The method of claim 6, further comprising microscopically measuring the solidified substance in the well of the multi-well plate.

12. The method of claim 6, further comprising drying the solidified substance in the well of the multi-well plate.

13. The method of claim 12, further comprising analyzing the solidified substance in the well of the multi-well plate by preferably transmission X-ray diffraction before drying the solidified substance.

14. The method of claim 12, further comprising analyzing the solidified substance in the well of the multi-well plate by preferably transmission X-ray diffraction after drying the solidified substance.

15. The multi-well plate of claim 1, wherein the sample micro-vessel is removably arranged in the through hole of the at least one of the plurality of wells.

16. The multi-well plate of claim 1, wherein at least a second one of the plurality of wells comprises a through hole and a second sample micro-vessel, and
　　wherein the second sample micro-vessel
　　　　has a body with a sidewall portion, a bottom portion and a hollow interior limited by the sidewall portion and the bottom portion, and
　　　　is made of the thermoplastic polyimide, and
　　wherein the body of the second sample micro-vessel is arranged in the through hole of the second one of the plurality of wells such that the bottom portion of the body of the second sample micro-vessel defines a bottom of the second one of the plurality of wells being made of the thermoplastic polyimide.

\* \* \* \* \*